Feb. 25, 1958     H. H. MEINCKE     2,824,671
DEVICE FOR UNLOADING AGRICULTURAL MATERIALS
Filed Feb. 16, 1954     4 Sheets-Sheet 1

Henry H. Meincke
INVENTOR
ATTORNEYS.

Feb. 25, 1958     H. H. MEINCKE     2,824,671
DEVICE FOR UNLOADING AGRICULTURAL MATERIALS
Filed Feb. 16, 1954     4 Sheets-Sheet 2

Henry H. Meincke
INVENTOR

BY *C. A. Snowles*
ATTORNEYS.

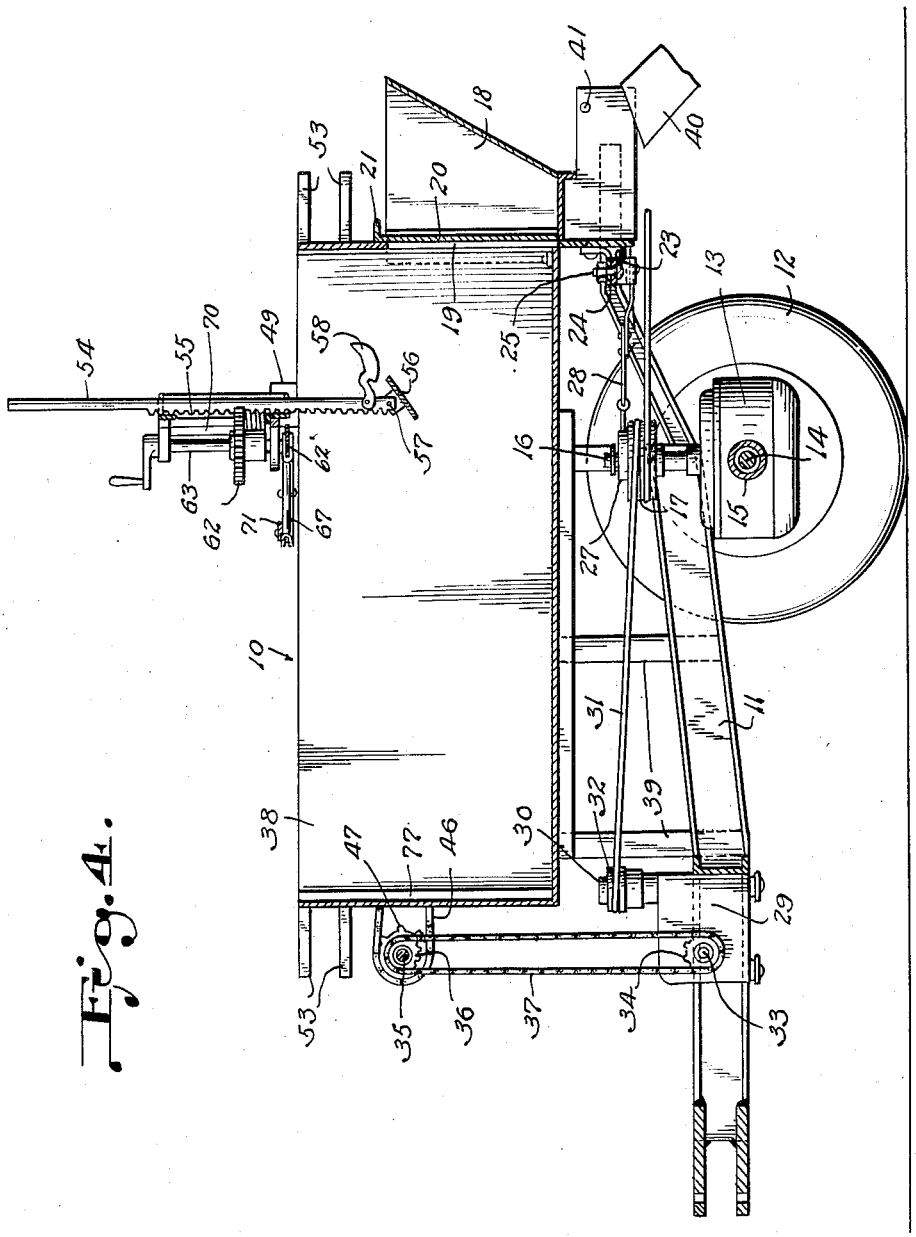

Feb. 25, 1958 H. H. MEINCKE 2,824,671
DEVICE FOR UNLOADING AGRICULTURAL MATERIALS
Filed Feb. 16, 1954 4 Sheets-Sheet 4
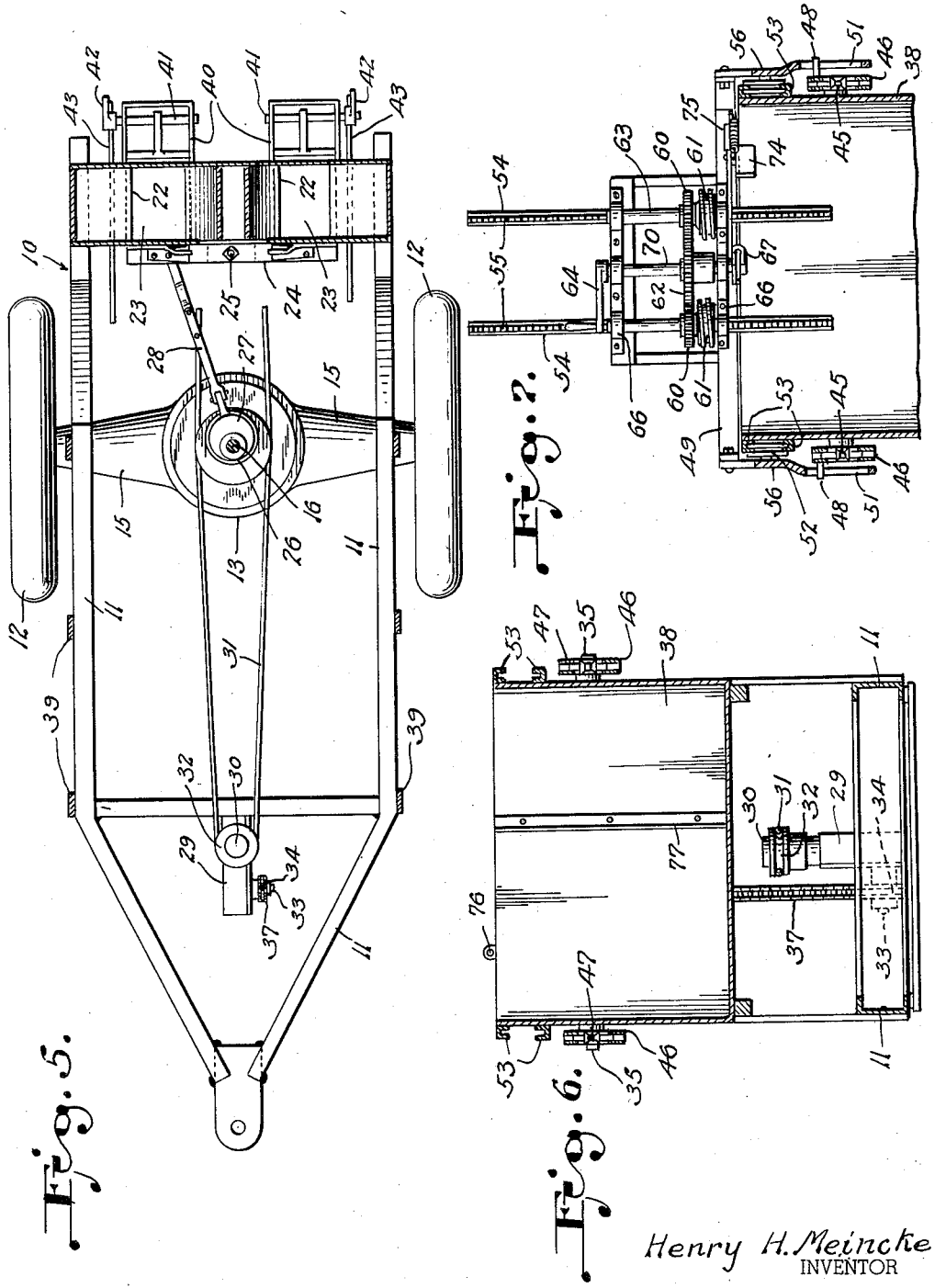
Henry H. Meincke
INVENTOR
BY C. A. Knowles.
ATTORNEYS.

United States Patent Office 2,824,671
Patented Feb. 25, 1958

2,824,671

DEVICE FOR UNLOADING AGRICULTURAL MATERIALS

Henry H. Meincke, Astatula, Fla.

Application February 16, 1954, Serial No. 410,592

2 Claims. (Cl. 222—177)

This invention relates to a new and improved device of the kind to be more particularly described hereinafter for proportionally unloading a selected weight of agricultural material in an orchard requiring a critical poundage of fertilizer or agricultural material to be distributed at different locations in the same field.

It is another object of this invention to provide a device of this kind to be moved about as by being towed by a tractor, a truck or other powered vehicle and having a material containing hopper with a trough at one end, a scraper in the hopper for scraping the material in the hopper toward the trough from which the material may be dispensed by conventional dispensing means.

It is yet another object of this invention to provide a device of this kind having a wheeled material containing hopper with a trough at one end of the hopper and a scraper movable in the hopper for scraping material from off of the top of a pile of material in the hopper toward the trough from which the material from the hopper may be dispensed.

A further object of this invention is to provide a wheeled spreader device of this kind having a trough at one end of an agriculture material containing hopper with a power actuated scraper movable along the length of the hopper toward the trough, there being a powered actuated valve means for controlling the movement of the material from the trough and a manually actuated valve means for controlling the movement of the material from the hopper into the trough.

It is yet a further object of this invention to provide an agricultural unloading device of this kind mounted upon a tractor drawn unit getting its motive power through the tires by their contact with the ground while in motion or mounted as an integral part of a truck furnishing its own motive power.

Other and further objects and advantages of the invention will be hereinafter described and the novel features thereof defined in the appended claims.

In the drawings:

Fig. 4 is a longitudinal section of my device.

Fig. 5 is a longitudinal section taken on the line 5—5 of Fig. 1.

Fig. 6 is a vertical section taken on the line 6—6 of Fig. 1.

Fig. 7 is a fragmentary vertical section, partly broken away, taken substantially on the line 7—7 of Fig. 1.

Fig. 8 is an enlarged horizontal section taken on the line 8—8 of Fig. 1.

Figure 1:
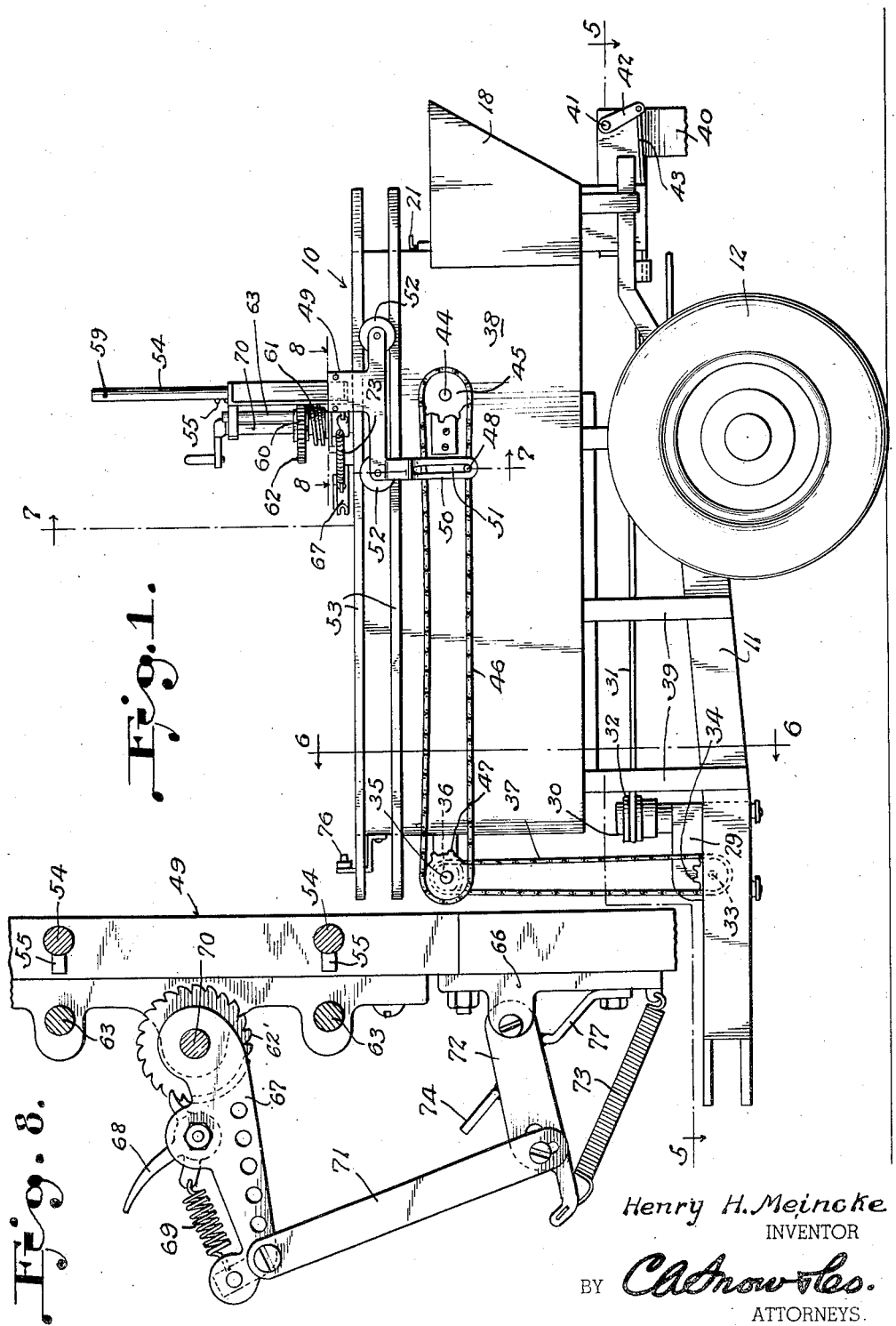
Fig. 1 is a side elevation of a spreading device constructed according to an embodiment of my invention.
Figures 2, 3:
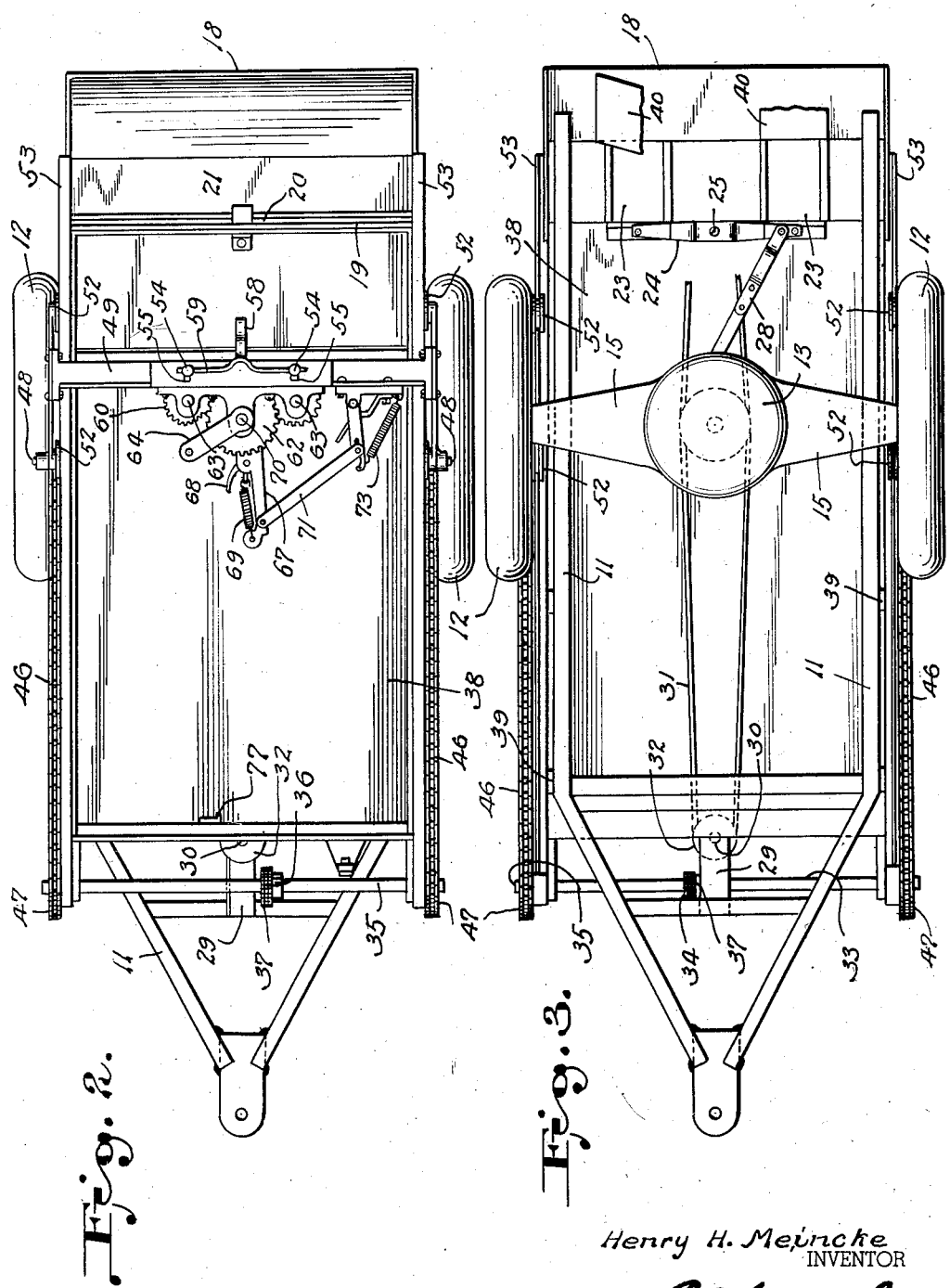
Fig. 2 is a top plan view thereof.
Fig. 3 is a plan view of the bottom.

Referring more specifically to the drawings, the numeral 10 designates generally a device for unloading agricultural material in a field having growing trees or other types of growths which requires a certain special kind of agricultural material.

The device 10 is adapted to be filled with the material to be dispensed about the field at the base of the shrubbery or trees and may be pulled about by a tractor or other approved type of hauling or towing equipment, not shown in the drawings.

The device 10 is formed with a base frame 11 having wheels 12 rotatably mounted on the opposite sides thereof. A differential member 13 is carried by the frame 11 having outwardly extending axles 14 which are engaged with the axis of the wheels 12. An axle housing 15 is supported about the axles 14 in a conventional manner to support the axles and protect the axles against any foreign material falling thereon.

The differential 13 is provided with a vertically extending shaft 16 therein with the pulley 17 mounted on the shaft 16 for rotation when the wheels are caused to rotate.

A hopper 38 is carried by and supported on the frame 11 by upwardly extending hopper supporting members 39 as clearly shown in the drawings.

A trough 18 is fixedly carried by the rear end of the hopper 38, there being an opening 19 through the rear wall of the hopper 38. A closure plate 20 is slidably supported on the rear end of the hopper 38 for closing the opening 19, the closure plate 20 being provided with a handle 21 on the upper side thereof so that the closure plate may be manually moved upwardly by a person desiring to uncover the opening 19.

The trough 18 is further provided with orifices 22 on the bottom thereof through which the material having been moved from the hopper into the trough may be dispensed onto the ground over which the device 10 is being moved.

The hopper can be easily handled when filled to its top with the scraper 56 latched in vertical position and fully retracted upwardly. The closure plate 20 then should be moved to its upward limit.

A valve plate 23 is reciprocally mounted in each of the orifices 22 being connected together by a cross bar 24 which is pivotally connected to the forward end of each of the valve plates 23 so that when one of the valve plates is moved to a position for closing its respective orifice 22 the other valve plate will be moved to a position opposite to the first mentioned valve plate.

The cross bar 24 is pivotally mounted on a pivot pin 25 so that the opposite ends of the cross bar 24 may move in opposite directions at the same time.

An eccentric cam 26 is fixed to the upper end of the vertically extending shaft 16 for rotation therewith. The eccentric cam 26 is surrounded by a ring 27, the ring 27 being connected to one end of a rod 28, the other end of the rod 28 being pivotally connected to one end of the cross bar 24 for effecting the reciprocal opening and closing of the orifice 22 during the movement of the device 10 on the wheels 12.

The movement of the device 10 on the ground will effect the reciprocal movement of the valve plates 23 for distributing the material from the hopper 38 and the trough 18 in a desired pattern.

At the forward end of the frame 11 there is provided a gear box 29 having a vertically extending shaft 30 which is actuated by a band 31 trained about the pulley 17 on the vertically extending shaft 16 and a second pulley 32 mounted on the vertically extending shaft 30.

A horizontally extending shaft 33 is extended from the gear box 29 and operatively connected to the vertically extending shaft 30 by gears, not shown in the drawings, so that when the vertically extending shaft 16 is actuated the vertically extending shaft 30 and the horizontally extending shaft 33 will likewise be immediately actuated.

A sprocket 34 is fixedly connected to the outer end of the horizontally extending shaft 33 to be actuated therewith on the outer side of the gear box 29.

A horizontally extending shaft 35 is rotatably mounted on the forward side of the hopper 38 for purposes to be hereinafter described.

An intermediate sprocket 36 is fixed to or connected on the horizontal shaft 35 for rotation therewith, there being a chain 37 extended around the immediate sprocket 36 and the sprocket 34 on the outer side of the gear box 29. A pair of tubes 40 are supported on the hopper 38 immediately below the trough 18 for directing the material released from the trough onto the ground or some intermediate broadcast or spreading member, not shown in the drawings.

Mounted adjacent to the tubes 40 there is disposed a horizontally extending shaft 41 having a bell crank 42 at one end thereof, the bell crank 42 being manually actuated by a rod 43 attached to it and actuated at the forward end of the device 10, by conventional actuating means as a crank handle, not shown.

The bell crank 42 and shaft 41 will actuate a closure plate for closing or partially closing an opening on the rear side of the trough 18 in order to control the amount of material being dispensed from the hopper 38 and trough 18 onto the ground.

A stub shaft 44 is mounted on each side of the hopper 38 adjacent to the upper open side thereof and each stub shaft 44 is provided with a sprocket 45 thereon so that a chain 46 may be trained about the sprocket 45 and about the sprocket 47 on each end of the horizontal shaft 35, described above, so that upon actuation of the vertically extending shaft 16, the chain 46 and the attached shafts and sprockets may be caused to rotate.

The chains 46 are disposed on the outer sides of the hopper 38 and there is provided an outwardly extending pin 48 on each of the chains, on the opposite sides of the hopper 38 for the purposes to be immediately described hereinafter.

A supporting bar 49 is carried on the upper side of the hopper 38 to be moved longitudinally of the hopper by the longitudinally extending chain 46. The supporting bar 49 is provided with a downwardy extending arm 50 having a slot 51 therein within which the pin 48 is adapted to be engaged so that upon movement of the chain 46, the supporting bar 49 will be caused to move longitudinally of the hopper 38.

Each end of the supporting bar 49 is provided with a truck having wheels 52 rotatably mounted thereon and the wheels 52 engage between a pair of vertically spaced apart channel rail guides 53 also supported on the outer sides and opposite sides of the hopper 38.

A pair of posts 54 are slidably supported on the supporting bar 49 intermediate the ends of the supporting bar and each of the posts 54 is provided with a gear rack 55 one side thereof for vertical movement of the posts 54 together to thereby move the scraper blade 56 vertically in the hopper 38.

The scraper blade 56 is pivotally connected to the lower end of each of the sliding posts 54 by a pivot 57 so that the scraper blade 56 may be moved from a substantially horizontal position to a vertical position relative to the posts 54 and material within the hopper 38.

A latch 58 is carried between the posts 54 for vertical pivotal movement and for latching engagement with the scraper blade 56. The latch 58 is provided with a hooked end for engagement with one edge of the scraper blade 56 to secure the scraper blade in a substantially vertical position when the scraper blade is engaged with the forward end of the hopper 38.

A bail 59 is pivotally mounted on the upper ends of the posts 54, connecting the posts 54 together, the bail 59 being specially provided for manually moving the posts 54 upwardly in the hopper 38 when and as desired.

Each of the posts 54 is provided with a gear 60 intermediate the length thereof, the gear 60 being transversely disposed relative to the posts and each of the gears 60 being supported adjacent to a worm 61 also fixedly secured to the posts. Each of the posts 54 is provided then with a worm 61 fixed relative to an adjacent gear 60, each of the worms 61 being engageable with the gear rack 55 for actuating the posts vertically relative to the hopper upon rotation of each of the worms 61.

An intermediate gear 62 is rotatably supported between the worms 61 and their respective gears 60 for actuating the respective gears 60 upon rotation of the intermediate gears 62. The worm 61 in engagement with the rack 55 of each of the posts 54 is rotatable on a shaft adjacent to the respective posts 54. The intermediate gear 62 is fixed on a vertically extending rotatable shaft 70 so that when the intermediate gear 62 is rotated the worms 61 will rotate in engagement with their respective racks 55 for elevating or lowering the posts 54.

The posts 54 are moved together upwardly relative to the hopper 38 by manually releasing the latch dog 68, Fig. 8, and turning the crank handle 64. The posts 54 and the scraper blade 56 are caused, by way of the racks 55 and worms 61 to move intermittently downwardly in the hopper 38.

The downward intermittent movement of the scraper blade 56 is automatically actuated and this automatic actuation of the worm 61 is accomplished by the outwardly extending arm 67 adjacent the intermediate gear 62. The outwardly extending arm 67 is provided with a latch dog 68 pivotally mounted thereon and engageable with a ratchet wheel 62' below the intermediate gear 62, as seen in Fig. 8.

A spring 69 is connected to one end of the latch dog 68 for continually urging the latch dog into engagement so that the gear 62 will be rotated upon rotation of the arm 67 when the flat cam 74, Fig. 8, is pressed against cam stop 76, Fig. 1. The latch dog 68 may be moved out of engagement with the intermediate gear by merely moving the latch dog against the tension of the spring 69.

The intermediate gear 62 and the outwardly extending arm 67 are fixed on a vertically extending shaft 70. A connecting arm 71 is connected between the arm 67 and a second arm 72 pivotally carried by bearing bracket 66 as clearly shown in Fig. 8 of the drawings so that upon movement of the arm 67, with the intermediate gear 62, the second arm 72 will be also caused to be actuated.

The connecting arm 71 is engaged with a selected adjustment opening in the arm 67 so that the posts 54 may be moved one tooth at a time, by the connection at one end of the arm 67, as shown in the drawings, or more teeth on each cycle of operation by moving the connection of the connecting arm 71 closer to the gear shaft 70. The regulation of the movement of the blade and posts is initially determined by the selected opening in the arm 67 to which the connecting arm 71 is attached.

A spring 73 is connected at one end to the outer end of the arm 72 and at the other end to the supporting bar 49 for continually urging the gears and worms 61 in a direction for lowering the posts 54 on the scraper blade 56.

A flat cam 74 is carried by the under side of the arm 72 and is adapted to be operatively engaged with a back stop 75, Fig. 7, also carried by the supporting bar 49. The back stop 75 will prevent the excess movement of the arm 72 as urged by the spring 73.

A cam actuating stop 76 is supported on the upper side of the forward end of the hopper 38 for causing the cam 74, connecting arm 71 and gear arm 67 together with the intermediate gear 62 to be actuated upon contact of the cam with the back cam actuating stop 76, described above. Such actuation will cause the posts 54 to be moved downwardly every time the supporting bar 49 has been moved to the forward end of the hopper. By such actuation the scraper blade 56 may only engage the top of the pile of material within the hopper 38.

A vertically extending bar 77 is secured to and carried by the vertical forward wall of the hopper 38. The main purpose of the bar 77 is to tip the blade 56 upon contact therewith to a substantially vertical flat upstanding position to engage the latch 58 and hold it in a substantially rigid vertical position while unloading material into the spreading mechanism at the rear of the machine. A similar bar is so located at the rear wall which unhooks the latch 58 to allow the blade 56 to tilt by gravity to a near horizontal position.

It is essential that the downward movement of the posts or blade into the material be adjustable so that the output into the trough can be regulated to furnish a very small or large amount of fertilizer for a tree or unit as the case may be.

In the use and operation of the device 10, the hopper is initially filled with the material to be distributed about the crop in a field. Upon movement of the device 10 in the field on the wheels the scraper blade will be moved from a front end of the hopper to the rear end from which the material is moved into the trough from which it may be distributed. The continual movement of the device 10 in the field will normally lower the scraper in the hopper and the reciprocating plates in the rear end of the hopper and trough will be actuated by the rotation of the wheels, by way of the differential 13 and cam means described above.

After a considerable amount of material has been distributed from the device 10, the scraper blade 56 will be normally positioned near the lower end of the hopper and the scraper blade may then be pulled upwardly for repeating the operation with another load of material to be spread.

In the movement of the scraper blade 56 toward the rear end of the hopper the scraper blade 56 will be in a substantially vertical position and secured in such a position by the latch 58 until the scraper blade has reached the rear end of the device at which time the scraper blade 56 will be substantially horizontal for movement to the forward end of the hopper. Engagement of the forward end of the hopper by the scraper blade 56 will again position the scraper blade in a vertical position for moving the material rearwardly in the hopper toward the trough to be distributed outwardly from the tubes where, when and as desired.

While the specific details of one embodiment of this invention have been herein shown and described, the invention is not confined thereto as changes and alterations may be made without departing from the spirit and scope thereof as defined in the appended claims.

I claim:

1. A spreader means comprising a frame, an axle rotatably carried by said frame, wheels on the opposite sides of said frame, a differential between the ends of said axle, a vertical shaft extending upwardly from said differential, a hopper carried by said frame, said hopper having a rear wall formed with a discharge opening, a closure for said opening slidably carried by said rear wall, a trough carried by said rear wall and adapted to receive the material passing through said opening, said trough having a delivery opening, a valve plate for said delivery opening, an operative connection between said vertical shaft and said valve plate for reciprocating said plates, a carriage, means slidably disposing said carriage over the top of said hopper, means connected between said carriage and said vertical shaft for reciprocating said carriage, a horizontal scraper blade engaging in said hopper, a pair of vertical blade supporting members carried by said carriage, and means for vertically adjusting said blade supporting members relative to said hopper.

2. A spreader means comprising a frame, an axle rotatably carried by said frame, wheels on the opposite sides of said frame, a differential between the ends of said axle, a vertical shaft extending upwardly from said differential, a hopper carried by said frame, said hopper having a rear wall formed with a discharge opening, a closure for said opening slidably carried by said rear wall, a trough carried by said rear wall and adapted to receive the material passing through said opening, said trough having a delivery opening, a valve plate for said delivery opening, means actuated by said vertical shaft to reciprocate said valve plate, a carriage, means slidably disposing said carriage over the top of said hopper, means connected between said carriage and said vertical shaft for reciprocating said carriage, a horizontal scraper blade engaging in said hopper, a pair of vertical blade supporting members carried by said carriage, means rockably securing said blade to the lower ends of said supporting members, a weighted latch member rockably carried by one of said supporting members and gravitatingly movable downwardly to blade latching position, a fixed blade rocking member carried by the front wall of said hopper adapted upon contact of the blade therewith to rock said blade to a vertical position, said latch member releasably latching said blade in vertical scraping position, said latch member at the end of the rearward movement of said carriage engaging the hopper rear wall and movable thereby to blade releasing position.

References Cited in the file of this patent

UNITED STATES PATENTS

| | | |
|---|---|---|
| 1,956,460 | Brown | Apr. 24, 1934 |
| 2,511,246 | Chamberlin | June 13, 1950 |
| 2,623,661 | Hurlburt | Dec. 30, 1952 |
| 2,646,899 | Stover | July 28, 1953 |